Jan. 5, 1943.  W. E. BOUTON  2,307,448
ATTACHMENT FOR RAKES
Filed June 13, 1941
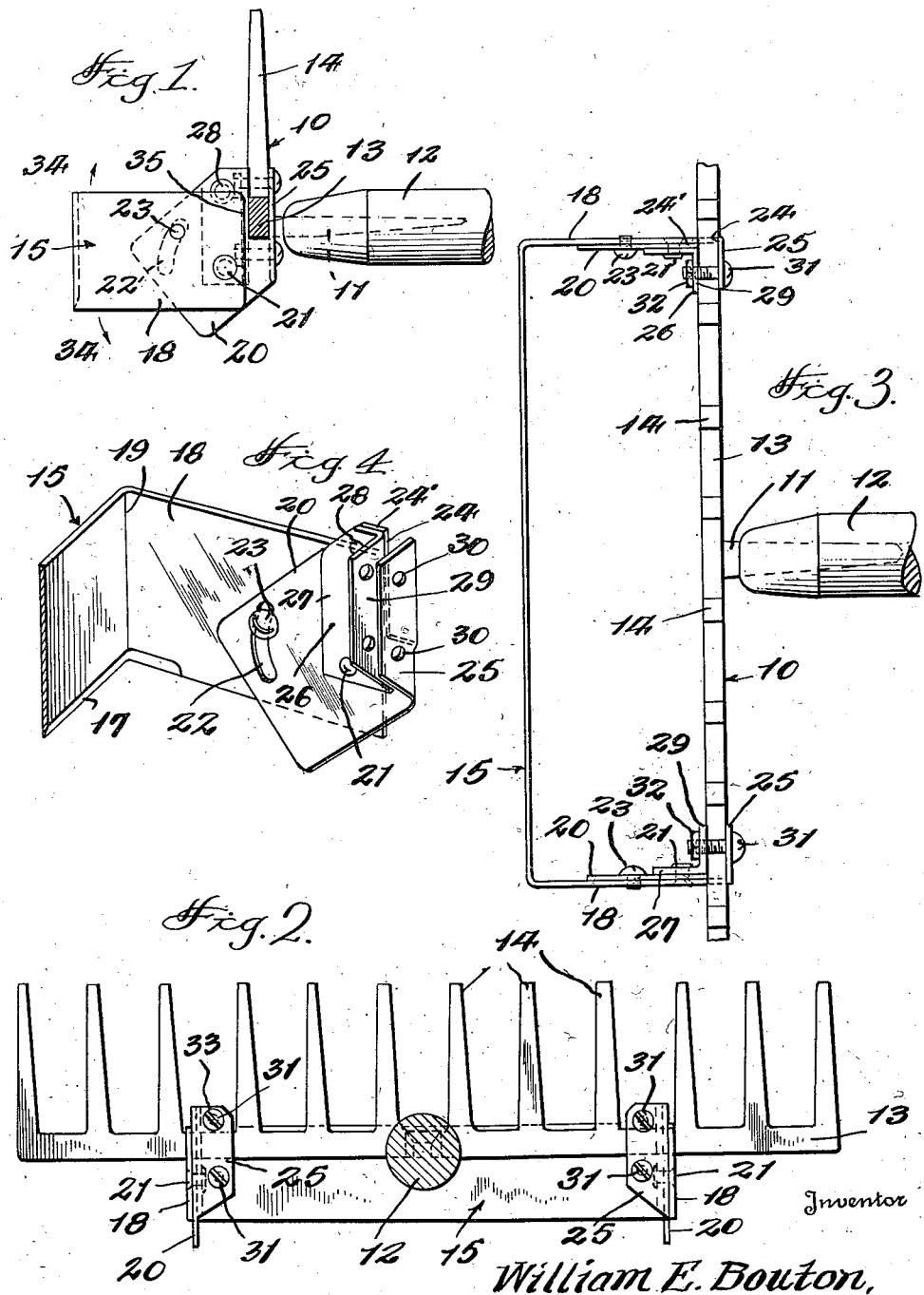
Inventor
William E. Bouton,
By Christian L. Nielsen
Attorney Patented Jan. 5, 1943

2,307,448

UNITED STATES PATENT OFFICE 2,307,448

ATTACHMENT FOR RAKES

William E. Bouton, Atascadero, Calif.

Application June 13, 1941, Serial No. 397,987

2 Claims. (Cl. 56—400.05)

The invention has for an object to provide a simple, light, and cheap construction of device adapted to be attached to rakes of conventional form to enable the use of the implement either as a rake or as a hoe when my attachment is applied.

A further important aim of the invention is to provide a novel form of manufacture in the hoe blade device for attachment to rakes, so that it may be readily applied without requiring modification of the rake head and may be put in place by the ordinary person, by the use of a screwdriver.

A further important object of the invention is to provide a novel means for adjusting the hoe blade angle with respect to the handle of the implement, to suit various uses, as for light weeding, or for cultivation more deeply, or for use as a scraper.

It is also an aim of the invention to embody the device so that notwithstanding that it may be stamped from sheet metal of moderate thickness, it will nevertheless, serve readily for rough use and be liable in a minimum degree to damage or derangement in the exigencies of uses to which the tool may be applied.

The invention will be found of value as a forest fire-fighting tool, when combined with a rake, as hereinafter disclosed. Thus in many situations, a rake only will be required to form a clear-way free of leaves and the like, especially in situations where only a light covering of leaves and humus is to be moved; but in other situations, where there are small bushes to be removed, the device may be quickly turned over and used as a chopper to remove such small brush. In addition to these uses, its advantages as a garden tool will be readily appreciated, and it may be also found useful in other respects, such as, spreading asphalt surfacing materials for roadways, and as an initial packer for such material, especially at the edges, where it is usually a practice for the workmen to use a special tool to tamp the material down lightly in order to make sure that neither too little nor too much of the surfacing material has been deposited when making repairs in limited areas.

The invention may also be useful in finishing concrete floors, and in other special situations.

Additional objects, advantages and features of invention will reside in the construction, arrangement and combination of parts involved in the embodiment of the invention, as will be more readily understood from the following description and accompanying drawing, wherein Figure 1 is a side elevation of a rake equipped with my invention, the rake head being inverted.

Figure 2 is an elevational view of the rake head next to the handle in a plane substantially at right angles to the handle.

Figure 3 is a bottom view of the rake and top view of my attachment combined therewith.

Figure 4 is a fragmentary perspective view of my attachment, detached.

There is illustrated a rake 10, having the usual head consisting of a shank 11 which is inserted in the end of a handle 12, in the usual way, a cross bar 13 extending rectilinearly at each side from the shank, this bar 13 having the usual rake teeth 14 formed on the lower side, and conforming generally to conventional practices in the production of garden hand rakes.

My attachment consists of a hoe blade device 15, consisting of a strip of sheet steel, the central portion of which is bevelled along one edge and sharp, suitable for the uses contemplated. The end portions of this strip are bent upwardly at right angles to the central portion on a line transversely of the strip a short distance inwardly of the termination of the bevel and sharpened side, so that a cutting edge portion is formed throughout the medial portion of the device, and extending outwardly on the inturned end portions, which constitute mounting ears 18. The lines 19 on which the ears are bent extend at right angles to the longitudinal dimension of the strip, and the ears require no special conformation, so that the blades may be cut in succession from a simple ribbon strip of steel of suitable thickness. In practice, the blade material has consisted of material approximately one-eighth of an inch thick, which has given the device sufficient weight for the uses contemplated, without objectionably increasing the weight of the rake for use as a rake. The illustrations in Figures 1, 2 and 3 of the drawing are approximately two-thirds the actual size of the attachment, the rake-head, however, being shown of less width than usual, for convenience in illustration. A mounting is provided for the blade at each end, this mounting consisting of two sheet metal elements at each end of the rake. One of these is the large flat plate 20 which is secured to the inner side of the respective ear 18 pivotally, by means of a rivet 21 located near the lower edge of the blade ear. The plate 20 extends forwardly beside the ear 18 a distance and has formed therein a curved slot 22, concentric with the rivet 21, a binding screw 23 being inserted through this slot and having threaded engagement in the ear 18 of the blade, so that the screw head may be used to bind the plate 20 against the ear 18 and so hold the blade in adjusted pivotal position. The plate 20 is extended longitudinally beyond the ears 18 a distance, and formed in its upper edge 24' with a vertical slot 24 opening through this edge, and adapted to receive freely therein the bar 13, and immediately at the rear edge of this slot, the material of the plate is bent inwardly at right angles, forming a flange 25. The plate 20 extends upwardly a sufficient distance to project above the bar 13, including the inturned flange 25, and the latter also extends below the bar a distance. The plate 20 is preferably formed of moderately resilient material, so that it has limited flexibility for the purposes as will appear. Secured to the inner face of the plate 20 there is an angle piece 26, formed of sheet metal bent on a rectilinear vertical line to form respective flanges, the base flange 27 being secured by the rivet 21, and a second rivet 28 engaged through the flange 27 of the plate 20 at the upper part of the latter. The angle piece 26 has a second flange 29, arranged in parallel spaced relation to the flange 25, the flange 29 being located immediately at the forward or outer edge of the slot 24.

The flanges 25 and 29 have suitable apertures 30 formed therethrough above and below the bar 13, the lower apertures 30 being below the end of the slot 24, and the upper apertures being spaced sufficiently from the lower ones to permit the accommodation of the bar 13 between the upper and lower apertures. Short bolts 31 are engaged through the registered apertures of the ears 25 and 29, and nuts 32 engaged thereon, so that the ear 25 may be drawn toward the ear 29 when required.

In the use of the article, it may be applied to a rake by removal of the upper bolt at each side of the attachment, and inverting the blade assembly and presenting the slot 24 downwardly over the bar 13. The bolts removed are then replaced, as at 33 in Figure 2, and the nuts on all the bolts tightened, so as to draw the ears 25 and 29 together against the bar 13 and clamp the latter firmly, so that the blade 15 is held rigidly upon the rake. For use of the blade 15, the screws 23 may be loosened, and the blade adjusted in the direction of either of the arrows 34, shown in Figure 1, to adapt and accommodate the blade to the particular uses involved at the time.

While I have disclosed in detail a specific form of the invention as it has been heretofore manufactured, and which is the best construction which I have evolved, it will be understood that various changes in the construction, arrangement and combination of the parts, substitution of materials and equivalents may be made without departing from the spirit of the invention, as may be more readily understood from the appended claims.

It may be noted from the specific form shown, that the top edge of the blade strip extends above the bottom of the slot 24, as may be seen in Figure 1, and the end of the blade being finished with an edge at right angles to the major dimension of the strip, a shoulder 35 is formed, which may engage against the bar 13 as a stop for relative movement of the blade 15 on its pivot 21, in the one direction. This would probably be the maximum elongation of the blade for ordinary uses, and generally, the blade might be required to be adjusted downwardly, so that the medial portion of the blade, or blade proper, would lie in a plane at an oblique angle to the axis of the handle 12 instead of in a plane at right angles to the handle as at present shown in Figure 1. However, as before stated, this angular relation of the blade to the handle is one to be determined by the nature of the work to be performed, and may also depend on the individual desires of the user. The screw 23 being engaged in the ear 18 at each end of the attachment, the blade may readily be moved downwardly to a limit determined by the length of the slot 22, as will be readily understood.

I claim:

1. A hoe attachment for rakes and the like comprising a mounting having spaced apart clamp ears to receive the upper part of a rake head, means to clamp the ears upon a rake head, said mounting having right angularly disposed ears arranged in parallel relation, a substantially U-shaped cutting blade having parallel arms pivotally connected to respective ears, a slot being formed in one concentric with the pivot axis and a clamping device on the other to secure the two together and movable in said slot.

2. A hoe attachment for rakes and the like comprising a mounting consisting of a body plate having a slot in its upper edge, of a depth to receive a cross bar of a rake head therein, and to extend thereabove a distance, material of the plate beyond the slot being bent at right angles to the body of the plate, so as to lie flat against the inserted rake-head, a flange member on the plate adjacent the opposite side of said slot in spaced relation to said inturned part, said inturned part constituting a clamping flange, said flanges having registered apertures therein below the slot, and at a level to lie above the top of an inserted rake-head, clamp bolts engaged through the apertures, and a blade pivoted on the mounting and extending outwardly beyond the rake head and having a transversely arranged blade thereon.

WILLIAM E. BOUTON.